United States Patent [19]

Valyi

[11] 4,352,777
[45] Oct. 5, 1982

[54] METHOD FOR FORMING HOLLOW PLASTIC OBJECTS

[76] Inventor: Emery I. Valyi, 5200 Sycamore Ave., Riverdale, N.Y. 10471

[21] Appl. No.: 120,266

[22] Filed: Feb. 11, 1980

Related U.S. Application Data

[60] Continuation-in-part of Ser. No. 5,960, Jan. 24, 1979, Pat. No. 4,225,304, which is a division of Ser. No. 911,359, Jun. 1, 1978, Pat. No. 4,207,134.

[51] Int. Cl.³ .............................................. B29C 17/07
[52] U.S. Cl. ..................................... 264/538; 264/530; 264/532; 264/537; 425/526
[58] Field of Search ............... 264/520, 521, 530, 532, 264/537, 538; 425/526

[56] References Cited

U.S. PATENT DOCUMENTS

| | | | |
|---|---|---|---|
| 2,359,216 | 9/1944 | Hofmann et al. | 425/540 X |
| 4,063,867 | 12/1977 | Jannière | 425/526 |
| 4,219,526 | 8/1980 | Mehnert | 425/526 X |

FOREIGN PATENT DOCUMENTS 2339019  2/1975  Fed. Rep. of Germany ...... 425/526

Primary Examiner—Jan H. Silbaugh
Attorney, Agent, or Firm—Bachman and LaPointe

[57] ABSTRACT

Method and apparatus for forming oriented, blown objects of moldable plastic material requiring prolonged tempering cycles to obtain conditions suitable for orientation. Disclosure provides a multiplicity of tempering molds in spaced relationship to each other for retaining and tempering parisons prior to orientation and blowing in a tempering cycle, whereby the tempering molds receive and release parisons seriatim, and whereby the overall operating cycle is substantially unaffected by the number of tempering molds.

18 Claims, 5 Drawing Figures

METHOD FOR FORMING HOLLOW PLASTIC OBJECTS

CROSS-REFERENCE TO RELATED APPLICATIONS

This application is a continuation-in-part of U.S. patent application Ser. No. 5,960, filed Jan. 24, 1979, now U.S. Pat. No. 4,225,304 which in turn is a divisional of U.S. patent application Ser. No. 911,359, filed June 1, 1978 now U.S. Pat. No. 4,207,134.

BACKGROUND OF THE INVENTION

This invention relates to the art of blow molding from a parison of articles of organic plastic material susceptible to the improvement of their properties by orientation and has for its principal object maintaining a rapid operating cycle despite the fact that the particular plastic may require prolonged tempering cycles to obtain conditions suitable for orientation.

The art teaches various methods and apparatus for obtaining blow molded articles of organic plastic material from a parison, such as in U.S. Pat. No. 3,349,155 and U.S. Pat. No. Re. 27,104. Generally, these methods are characterized by forming a parison in a parison mold on a blow core, placing said formed parison and blow core into a blow mold and expanding said parison in the blow mold by means of fluid pressure.

While the blow molding operation tends to impart orientation to the article, such orientation is predominantly circumferential, i.e., not bi-axial. Also, the degree of such orientation is difficult to control. It is therefore difficult to obtain the advantageous properties in the article that bi-axial orientation by stretching and blowing is capable of providing.

It is known that the control of orientation depends largely upon the control of the temperature of the parison just prior to orientation. It is found that such temperature control is best obtained by enclosing the article prior to the orienting step in cooling and/or heating means that impart temperatures, preferably by contact with the corresponding surfaces of the parison, to the regions of the parison corresponding to the degree of deformation that is intended for such regions.

However, certain plastics, polypropylene being the most prominent, require a prolonged tempering cycle prior to bi-axial orientation by stretching and blowing. Thus, tempering cycles in terms of minutes may be called for, in contrast to tempering cycles measured in seconds that are needed in connection with other materials.

It is, therefore, a principal objective of the present invention to devise a method and apparatus for use with this type of material which may introduce an extended tempering cycle.

It is a particular object of this invention to provide a method and apparatus as aforesaid which does not prolong the actual operating cycle of the device.

It is a still further object of the present invention to provide a method and apparatus as aforesaid and which is capable of providing the aforesaid advantages without the necessity of constructing an extremely bulky and inefficient heating apparatus.

Further objects and advantages of the present invention will appear hereinbelow.

SUMMARY OF THE INVENTION

In accordance with the present invention it has now been found that the foregoing objects and advantages may be readily obtained and an improved method and apparatus provided.

The method of the present invention forms oriented, blown objects of moldable plastic material requiring prolonged tempering cycles to obtain conditions suitable for orientation. The method comprises providing a plurality of tempering molds in spaced relationship to each other for retaining and tempering parisons prior to orienting and blowing in a tempering cycle, placing parisons to be tempered in one of said tempering molds seriatim at a first station, moving said parisons prior to orientation and blowing from said first station to at least one second station spaced from and adjacent to said first station for prolonged tempering, providing a blow mold in spaced relationship to said at least one second station for forming the tempered parisons into oriented, blown objects, removing the tempered parisons from the tempering molds at the end of the tempering cycle prior to orientation and blowing and placing same into said blow mold, whereby the tempering molds receive and release parisons seriatim and whereby the overall processing cycle is substantially unaffected by the number of tempering molds.

Preferably, a plurality of tempering molds and a plurality of second stations are provided, and preferably, the parisons are moved from tempering mold to tempering mold by means of cores engageable with the parisons.

The preferred apparatus of the present invention includes a plurality of tempering molds in spaced relationship to each other for retaining and tempering parisons prior to orientation and blowing in a tempering cycle, a first means (preferably a core) engageable with one of said tempering molds for placing and leaving parisons to be tempered in said engageable tempering mold seriatim at a first station, a second means (preferably a core) engageable with said parisons at said first station and operative to remove said parisons from said tempering mold at said first station and place and leave said parisons in a second of said tempering molds at a neighboring second station adjacent to said first station for prolonged tempering, a blow mold for forming said tempered parisons into oriented, blown objects in spaced relationship to said second station, and a third means for removing said tempered parisons at the end of said tempering cycle prior to orientation and blowing from said tempering molds and placing same into said blow mold, whereby said tempering molds receive and release parisons seriatim and whereby the overall cycle of said apparatus is substantially unaffected by the number of said tempering molds.

In the preferred embodiment the first, second and third means are first, second and third cores. Also, preferably a plurality of second stations are provided adjacent each other and a plurality of second cores, wherein each of the second cores is operative to remove a parison from a tempering mold at one of the second stations and place and leave the parison so removed in another of the tempering molds at another of the second stations.

It can be seen, therefore, that the method and apparatus of the present invention is simple and expeditious and does not involve the use of cumbersome devices. One may readily accommodate those plastics requiring extended tempering cycles without prolonging the operating cycle and, importantly, maintain a high operating cycle.

DETAILED DESCRIPTION OF THE PREFERRED EMBODIMENTS

Figure 1:
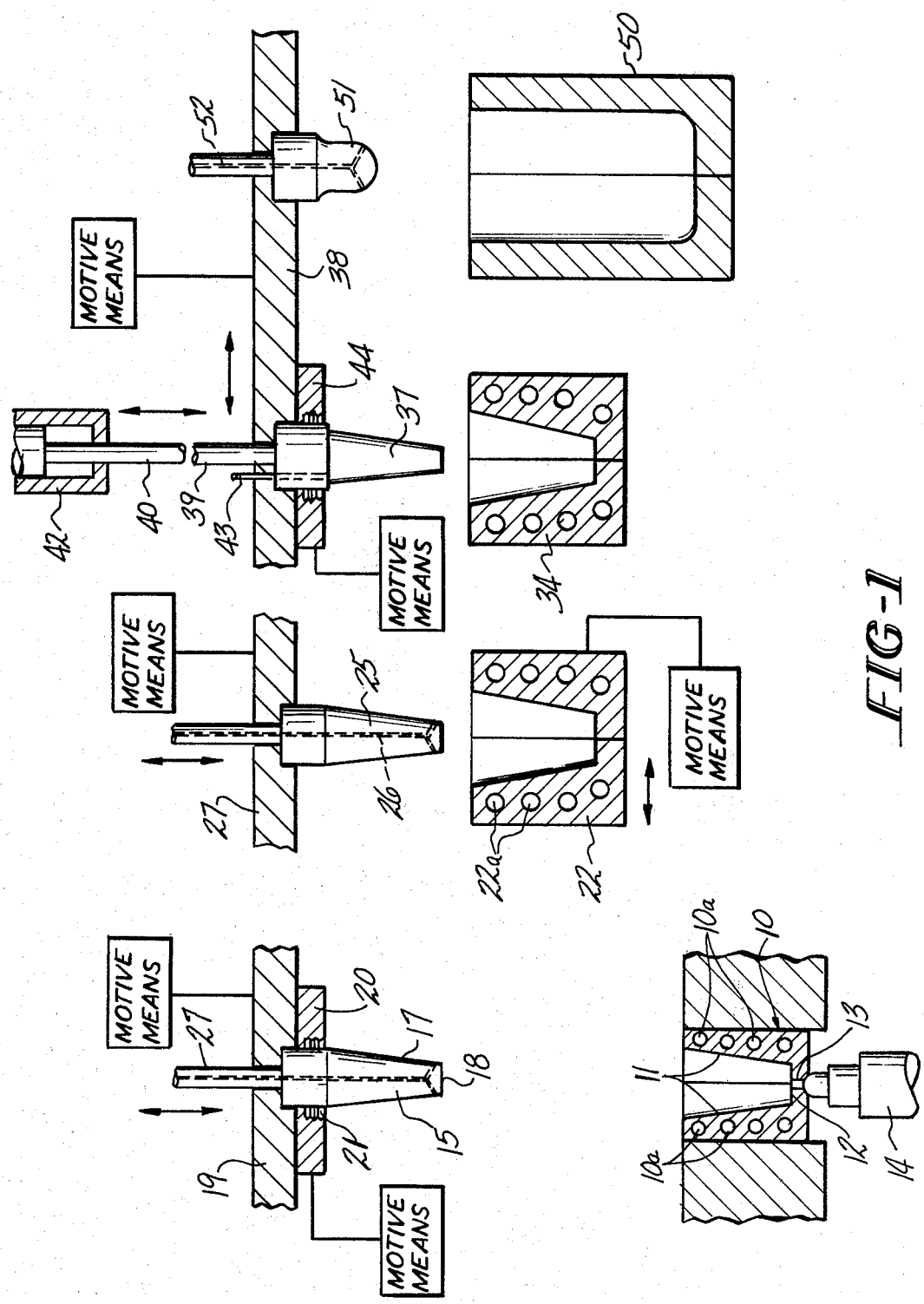
FIG. 1 is an elevation, partly in section, illustrating the method and apparatus of the present invention.
Figure 2:
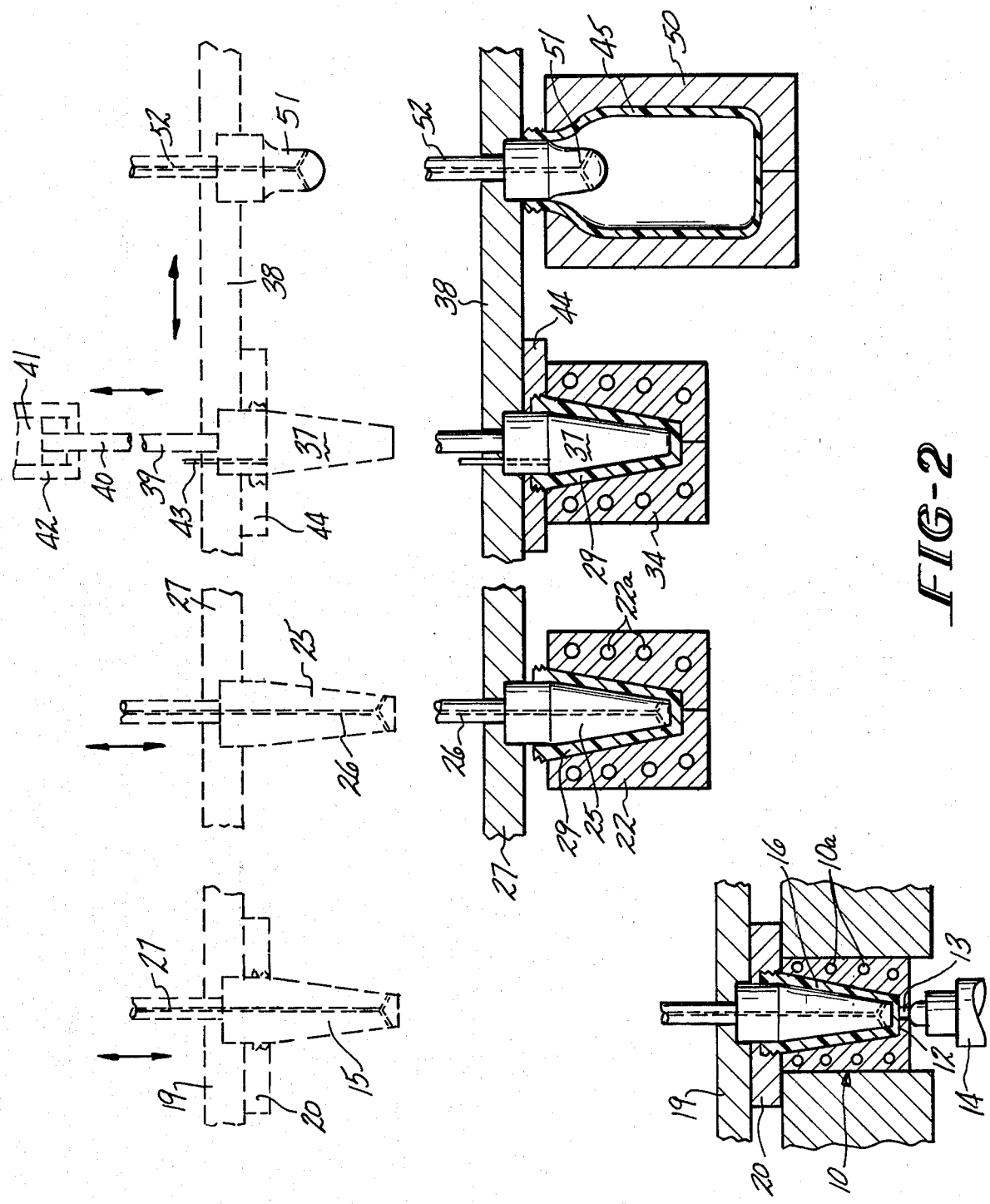
FIGS. 2 and 3 are views similar to FIG. 1 with additional portions in phantom showing a sequence of operations according to an embodiment of the present invention.
Figure 3:
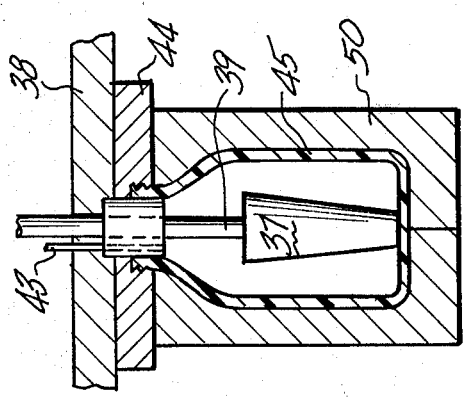
Figure 3:
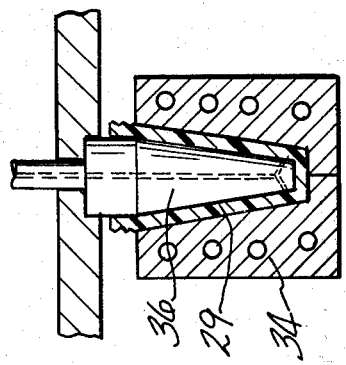
Figure 3:
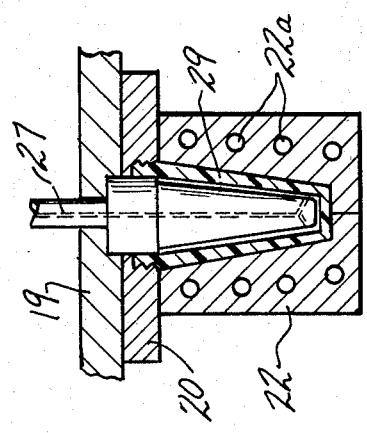
Figure 3:
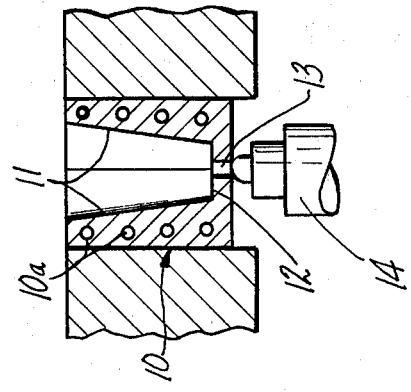

Referring to the drawings in more detail, FIGS. 1, 2 and 3 illustrate an apparatus in accordance with one embodiment of the present invention. In this embodiment, the parison is provided by an injection molding process; however, the invention is not limited thereto and includes other known molding processes that are capable of producing parisons such as compression molding, casting, extrusion with or without secondary operation, and the like. FIG. 1 depicts a parison die 10, having outer walls 11 which may be separable, depending upon the shape of the parison and which are adapted to form the outer surface of the parison, and having an end wall 12 shaped to form the end wall of the parison. The parison die 10 may be temperature controlled, such as by heating or cooling elements 10a contained therein which are connected to appropriate heat transfer sources (not shown) whereby such temperature control may be arranged in several zones to obtain different temperatures in different regions of the parison. The end wall 12 of the parison die has an injection opening 13 registering with an injection nozzle 14 through which the organic plastic material is injected into the parison die. The parison die 10 is shown as split for convenience in opening to release the formed parison; however, it should be understood that the invention is not limited thereto, as one-piece dies suitably designed for release of the parison are encompassed herein.

As indicated hereinabove, the plastics contemplated in accordance with the present invention are the moldable organic plastic materials whose properties are improved by orientation and which require prolonged tempering cycles to obtain conditions suitable for orientation, such as polypropylene polymers and copolymers. In some instances one may also advantageously process relatively thick-walled parisons that require excessive cooling or tempering cycles in the injection mold thereby tying up the injection mold for an inordinate period of time.

The formation of the parison in accordance with the embodiment illustrated in FIGS. 1, 2 and 3 takes place after a first core 15 (preferably a blow core) illustrated in FIG. 1, and set forth in phantom in FIG. 2, and die 10 are brought into engagement by suitable mechanical means such as the motive means shown schematically in FIG. 1. In the embodiment shown in FIGS. 1, 2 and 3, core 15 is axially reciprocable in the direction of the arrow into and out of engagement with die 10. Upon completion of injection through nozzle 14, a parison 16, having substantially the configuration represented in FIG. 2, is formed.

Side wall 17 and an end 18 of core 15, walls 11 and 12 of parison die 10, and the neck mold 20 constitute a die cavity in which the parison is formed. Core 15 may be temperature controlled in one or more zones, such as by internal heat exchange circuits known in the art contained therein, which are connected to an appropriate heat transfer or power source (not shown). Core 15 is carried by platen 19. This assembly further includes a neck mold 20 in which the neck of the parison is formed and which remains engaged with the parison while the latter remains on blow core 15 after disengagement from the parison die, which neck mold may be independently temperature controlled. The neck mold may possess threads 21 for defining a threaded opening in the final molded object. The neck mold 20 may be split and opened into two portions by suitable mechanical means such as the motive means shown schematically in FIG. 1, to release the parison, or, if the configuration of the neck permits, may be of one-piece construction and, thus, separable from the parison as a unit.

During separation of the parison die 10 and the core 15, the parison 16 is sufficiently retained thereon by means of neck mold 20, or by other means, such as an undercut, if necessary. Upon separation, the parison assumes the position depicted in FIG. 1, that is, core 15 containing parison 16 thereon is moved axially upwardly.

First mold 22, which is a conditioning, i.e., tempering mold and may be a pre-forming mold, and core 15 are brought into alignment so as to juxtapose first tempering mold 22 and parison 16, illustrated in FIG. 3. As shown, first mold 22 is laterally reciprocable at a first station by suitable mechanical means, such as the motive means shown schematically in FIG. 1 and for example on guide rails 23 shown in FIG. 4, with the first mold moving in the direction of the arrow into and out of alignment with core 15. Thus, the first station includes the positioning of the first mold either in alignment with the first core 15 as shown in FIG. 3 or out of alignment with the first core as shown in FIGS. 1-2. Mold 22 is temperature controlled, frequently in multiple zones which may be disposed along the length thereof, as by heating or cooling elements 22a which are connected to appropriate heat transfer sources (not shown). It is possible, although not preferred, to align first mold 22 and parison 16 by lateral or circular reciprocation of core 15.

Referring to FIG. 3, upon alignment of first tempering mold 22 and core 15 bearing parison 16, core 15 and parison 16 are then placed within first mold 22, for example, by the axial reciprocation of core 15. Other means of engaging parisons and molds may be used and are well known, such as those disclosed in U.S. Pat. Nos. 2,853,736 and 2,974,362. The parison is then released from first core 15 into first mold 22, as by stripping it axially which may be facilitated, if desired, by partially expanding the parison. The partial expansion is carried out by arranging for the mold cavity of mold 22 to be a small fraction of an inch larger than the parison and by applying fluid pressure through channel 27 on the inside of the parison thereby expanding the parison into conformance with the cavity of mold 22. Passage 27 is provided within core 15 and may terminate at a valve-like, closeable portion of the core well known in the art. Separation of the parison from core 15 may then be facilitated by air-pressure stripping of the parison from the core, with removal of the core from the parison leaving the parison in mold 22. It should be noted that such expansion is not always necessary, but is often helpful as in the example shown. If desired, an exit channel (not shown) may be provided on mold 22 to permit the removal of air from the mold cavity as the parison enters facilitating the establishment of contact of the parison with the mold walls.

The temperature of first mold 22 is controlled by heating or cooling means 22a connected to appropriate heat transfer sources (not shown), or by electric heaters, to optimize the parison temperature for subsequent operations in a manner to be described below. Naturally any suitable heating or cooling means may be used in any of the heating or cooling coils described herein, such as a passage containing heat transfer fluid maintained at a suitable temperature, electric resistance heaters or raidant heat sources.

FIG. 3 illustrates the pressure molded parison 16 as conformed to the shape of the mold cavity in first mold 22, for example, by the exertion of fluid pressure, with the partially expanded parison labeled 29. At times the shape of partially expanded parison 29 may be made such that a second core may be inserted into substantially complete surface contact therein, as shown in FIG. 2, permitting heat exchange throughout, by contact of the second core and the parison. In such an instance, the said shape should exhibit no undercuts or reverse curves on the inside surface, for example, due to an outward taper over its inside surface. However, the parison shape does not always permit this, for example, in some cases of long, narrow-necked parisons, in which cases it may be necessary to forego contact heating the inside of the parisons.

After completion of the transfer of the parison into first tempering mold 22, that mold and first core 15 are separated as by moving the first core plus first neck mold axially in the direction of the arrow, usually accompanied by the application of air pressure at the inside of the parison by means of the first core, and the parison 29 thus transferred is retained in first tempering mold 22. Core 15 and neck mold 20 are then returned to the starting position as illustrated in FIG. 1, and first tempering mold 22 containing the parison 29 which may be partially expanded, is shifted laterally from the first position of the first station to the second position of the first station into the position illustrated in FIGS. 1 and 2.

In the standard procedure as described in the aforesaid copending U.S. patent application Ser. No. 5,960, the tempered parison 29 is transferred to a second core for final orientation and blowing. However, as indicated hereinabove, certain plastics require a prolonged tempering cycle prior to bi-axial orientation by stretching and blowing. If such plastics were processed by said standard procedure a significant delay in the processing cycle would ensue which would naturally result in a much less economical operating cycle.

Figure 4:
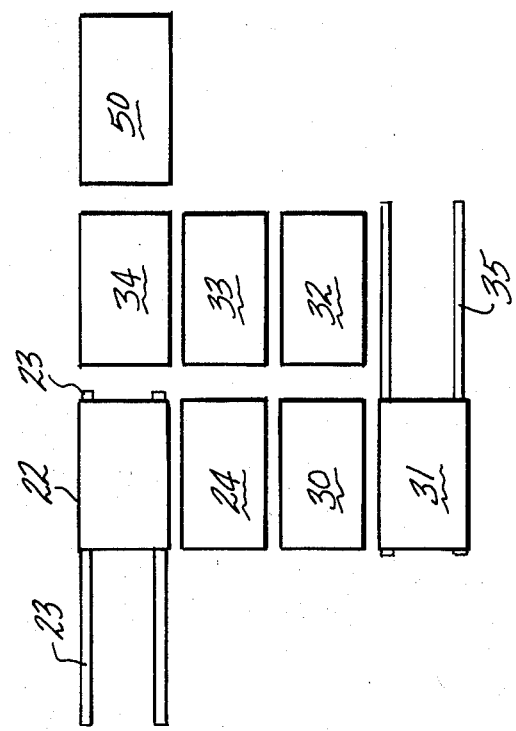
FIG. 4 is a schematic view showing a plurality of tempering molds according to one embodiment of the present invention for use in conjunction with FIGS. 1-3.

Therefore, in accordance with the present invention the parisons are moved prior to orientation and blowing from the first station to at least one second station spaced from and adjacent to said first station for prolonged tempering. Such a device is shown in FIGS. 1-4. FIG. 4 especially shows a plurality of second stations spaced from the first station. Thus, a stationary second tempering mold 24 having a similar configuration to the first tempering mold is shown adjacent first mold 22 at the second position of the first station. Second core 25, which if desired may have a neck mold associated therewith as with core 15, and carried on platen 27 and having a configuration similar to core 15 is then moved axially by motive means shown schematically in FIG. 1 into engagement with parison 29. The parison 29 is then removed from mold 22 by core 25 as by internal air pressure through line 26 or by a neck mold if employed, and the core 25 carrying parison 29 is side shifted into alignment with mold 24 again moved by motive means shown schematically in FIG. 1. The core 25 and parison 29 are then moved axially into engagement with mold 24, parison 29 is left in mold 24 and core 25 removed therefrom assisted if necessary by means of air pressure via line 26. Core 25 is then side shifted back to the second position of the first station to process a second parison. Naturally the tempering is continued in the second mold.

FIG. 4 shows a series of additional tempering molds 30, 31, 32, 33 and 34, all having a configuration similar to the first tempering mold 22, for extended tempering. The parisons are transferred from mold to mold by a series of reciprocable third cores and by mold 31 which is movable as on rails 35 between a forward and a rearward station in the same manner as with mold 22, said molds and cores having the same configurations as core 25 and mold 22. Thus, molds 24, 30, 32, 33 and 34 are stationary. One core is reciprocable between alignment with molds 24 and 30, one core between alignment with molds 30 and 31 (rearward station), one core between alignment with molds 31 (forward station) and 32, one core between alignment with molds 32 and 33, and finally core 36 (FIG. 3) between alignment with molds 33 and 34. Thus, parison 29 is transferred from mold 24 to mold 30 by means of a third core reciprocable therebetween in the same manner as core 25 reciprocates between molds 22 and 24. Parison 29 is further transferred from mold 30 to mold 31 (rearward position) in the same manner. Mold 31 containing parison 29 moves from the rearward position in alignment with mold 30 to the forward position in alignment with mold 32 via rails 35 and by motive means, not shown. Parison 29 is then transferred from mold 31 to mold 32 in a similar manner by a reciprocable core, and thence from mold 32 to mold 33 by a further reciprocable core, and thence from mold 33 to mold 34 by reciprocable core 36. Naturally, it can be appreciated that a series of parisons are simultaneously processed in the plurality of tempering molds at the plurality of second stations. Also, the basic processing cycle is not disturbed by the extended tempering cycle. A key feature of the present invention is the preparation of a parison spaced from and in alignment with the first station wherein a plurality of second stations are situated to the side of said alignment. As shown in FIG. 4, five tempering molds are situated to the side of the alignment; however, it can be understood that the exact number of side stations depend on the length of the tempering cycle desired. Thus, one can use only three side stations, or more than five side stations, or only a single side station, or even no side stations at all. Naturally, the present invention is most advantageous when a long tempering cycle is necessary requiring a plurality of side stations since extended tempering cycles can be obtained with difficult to process materials while maintaining a rapid operating cycle.

As shown in FIGS. 1-4, the parisons are transferred from mold to mold by means of cores with or without the assistance of a neck mold. However, one may if desired transfer the parisons by means of the neck molds alone wherever core transfer is used throughout the present specification, or by any desired combination of core and neck mold transfer, with core transfer being preferred.

Parison 29, which is retained within first mold 34, is thereby transferred into alignment with a fourth core 37 which is carried by platen 38 and as with the other cores may be provided with temperature control means, and which may have an external configuration shaped to conform to the internal configuration of the parison 29. Since axial stretching of the parison is desired, core 37 will include a stretch and blow assembly which comprises a mandrel extension 39 which is reciprocable as indicated by the arrow in FIG. 1 to axially extend the parison 29. An actuating means is shown which comprises a push rod 40 which engages extension 39, and which is connected to a piston 41 housed within a cylinder 42 which may, for example, be responsive to hydraulic pressure exerted by a pump, not shown. By controlling the flow of fluid into cylinder 42, the speed of piston 41 and therefore of the movable portion of core 37 may be controlled to stretch the parison at the speed best suited for the temperature of the parison. Such actuating means is merely illustrative of one manner of operation, as other actuating means known in the art can be employed herein.

Core 37 is situated in alignment with and in spaced relationship to core 15 and first tempering mold 22. Also, core 37 is aligned with core 25 when core 25 is situated at the second position of the first station. It can be readily seen that the location of respective cores and molds enables the concurrent pursuit of the extended tempering cycle as well as the final forming process with separate parisons. The ability to conduct the various operations in the process and apparatus of the present invention represents one of the notable advantages thereof.

Core 37 is then aligned with parison 29 residing in tempering mold 34 and core 37 is placed into engagement with mold 34 by axial movement of core 37 via the motive means shown schematically in FIG. 1. A fluid passageway 43 is provided and terminates at the end surface of that portion of core 37 which does not move during the movement of extension 39. Fluid passageway 43 also connects to a source of fluid under pressure, not shown. Accordingly, fluid may enter the space inside parison 29 during final expansion, discussed hereinbelow, once passageway 43 is opened by movement of the extension 39 and correspondingly of the movable portion of core 37.

In accordance with the process and apparatus of the present invention, the parison 29 is processed rapidly and uniformly and without interference with the balance of the processing cycle despite the fact that an extended tempering cycle is necessary.

The transfer of parison 29 to finishing mold 50 is conducted by core 37 which is in engagement with mold 34 and parison 29, if desired with the assistance of neck mold 44. Core 37 with parison 29 thereon is separated from mold 34, which as with the other molds may be split to release parison 29, by moving core 37 axially by suitable mechanical means. Upon release, core 37 with parison 29 thereon returns to the position illustrated in FIG. 1 and depicted in phantom in FIG. 2.

In accordance with the present invention, finishing or blow mold 50 is in lateral spaced relationship to final tempering mold 34, with both of these molds being fixed. This avoids the necessity of moving large masses of material.

As can be seen in FIGS. 1 and 2, an article removal plug 51 for removing the finished article is in integral, lateral spaced relationship to final core 37, with both the final core and the article removal plug being carried on platen 38. Therefore, when the final core or blow core engages parison 29 in mold 34, the removal plug 51 engages the finished article 45 in blow mold 50. As shown by the arrows, cores 37 and 51 are axially and laterally reciprocable so that core 37 transfers parison 29 from mold 34 to mold 50 by a combination of axial, lateral and axial movements. Simultaneously, removal core 51 removes the finished article from mold 50, which also may be split and separable to facilitate the extraction of the finished article, and transfers same to an ejection station located laterally of mold 50 (not shown) for removal of the finished article while core 37 engages mold 50.

Core 37 carrying parison 29 is then received in mold 50, with the temperature of parison 29 having been adjusted in an extended tempering cycle as described hereinabove. Parison 29 is then axially extended to the bottom of mold 50 by the advancement of the movable portion of mandrel 39 by means of push rod 40 at a predetermined rate. Thus, the present invention controllably stretches the parison longitudinally before final blowing and thereby produces orientation in the axial direction as well as the orientation subsequently produced by blowing. It can be readily appreciated that the temperature of the parison preparatory to stretching and blowing is properly, conveniently and without interference with the processing cycle controlled by the respective molds and cores. While stretching occurs passageway 43 is kept open to provide pressure equalization of the inside of the parison with the atmosphere to prevent collapse of the parison due to the vacuum created inside it as its inside volume increases during stretching.

After completion of axial extension, the parison is fully expanded to conform to the configuration of finishing, i.e., blow mold 50, to form the final object 45 which, in the embodiment illustrated herein, is an open-ended container. Naturally, a wide variety of shapes may be prepared as the commercially known shapes which may be a bottle, a jar or a cup-shape. Full expansion is accomplished by supplying fluid under pressure through passageway 43 into the interior of axially extended parison 29, or at times and at various rates, into the interior of the parison while it is being extended.

After full expansion is completed, core 37 and blow mold 50 containing final object 45 are separated as described hereinabove. Core 37 is then moved axially, laterally and axially, which again positions said core in mold 34 and at the same time positions removal core 51 in the finished article for removal of same after the finished article has cooled sufficiently for that purpose. The cycle is then repeated.

In the embodiment illustrated herein, finishing mold 50 is longitudinally split into two sections which may reciprocate in and out of communication by an actuating means, not shown, such as for example a hydraulic cylinder. Thus, the two sections of finishing mold 50 may be parted an amount sufficient to permit easy removal of article 45 by core 51 which may be inserted into the neck thereof with a tight fit. Prior to such opening of mold 50 and removal, fluid pressure may be applied through passageway 52 to continue the blowing process, if desired, in cases requiring continued contact of article 45 with blow mold 50 for the purpose of extended cooling. Alternatively, passageway 52 may be utilized to continue to supply cooling air to the inside of the finished article, or to apply suction to the inside of the finished article to aid in retaining same thereon.

It is noted that the positioning of the components as shown in FIG. 3 shows mold 22 located at the first position of the first station so that the second position of the first station does not show any component located therein. Also, in this configuration core 36 is in engagement with mold 34 and core 37 is in engagement with finish mold 50.

Figure 5:
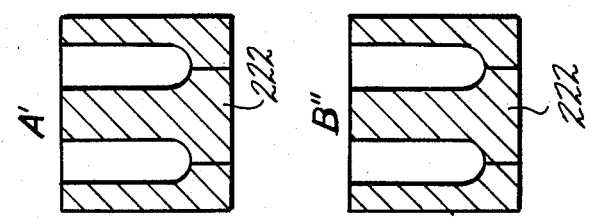
FIG. 5 is a schematic view showing an alternate embodiment of the present invention.
Figure 5:
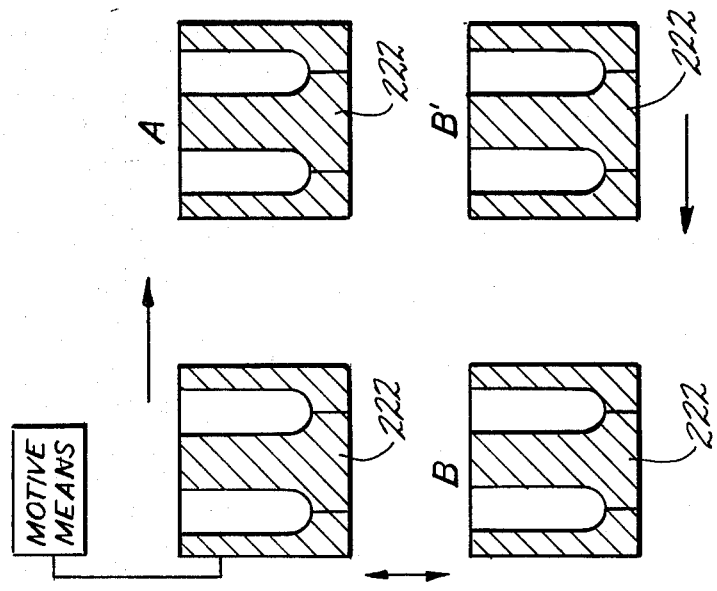

Naturally, the apparatus of the present invention is susceptible of numerous variations such as those described in the aforesaid copending application U.S. Ser. No. 5,960 which is incorporated herein by reference. A particularly advantageous variation is shown in FIG. 5 herein. In the embodiment shown in FIG. 5, a multi-tier arrangement is provided in the tempering station showing a plurality of first molds 222. In operation according to FIGS. 1–4, when the mold 222 with the parison reaches the tempering station it is side shifted by conventional motor means to a neighboring position A. In a next cycle, it may be further side shifted into an adjoining position A' and so on, whereby the number of such side positions will depend upon the actual tempering cycle desired. As illustrated in FIG. 5, upon reaching A', the tempering mold is moved to a lower tier, i.e., into position B'', from whence it is moved further into position B', and from there to position B from which it is elevated into the original upper tier, i.e., into the position at which mold 222 had originally entered the tempering cycle. Positions A, A', etc. and B, B', etc. may of course be arranged at either side or both sides of the tempering station which is of course true of any of the embodiments of the present invention. It can be seen that this embodiment also represents a simple side shift and elevating device wherein the parisons may be given any extended tempering desired without impeding the overall operating cycle. Thus, in accordance with all embodiments of the present invention the machine output will remain the same regardless of tempering dwell provided that a sufficient number of tempering molds are used. Naturally, all molds in circulation may be connected to a source of energy, for example, in the case of electric heating, electric power may reach each mold over a sliding connector cooperating with suitable conventional bus bars.

In accordance with the embodiment of FIG. 5, the parisons arriving in the first tempering mold are not removed therefrom as in the embodiment of FIGS. 1–4. In the embodiment of FIG. 5, the first mold is side shifted to give an extended tempering cycle while keeping the parisons under controlled tempering conditions. The final removal of the tempered parison may occur at position B.

Instead of the preferred device shown in the instant specification for using a plurality of tempering molds in accordance with any embodiment discussed or described herein, it is conceivable to move a plurality of first molds or simply move the parisons along different paths, for example, in a circle, which may be vertical or horizontal. However, care must be taken to keep the parisons in a vertical orientation to avoid their distortion and to keep the molds in contact with temperature control units in order to provide the desired tempering conditions.

Also, while FIGS. 1–4 show a single tempering mold for holding a single parison, and while FIG. 5 shows a tempering mold for holding two parisons, it can be readily appreciated that the tempering mold may hold any number of parisons depending on the particular operating cycle. Thus, for example, the tempering molds in FIGS. 1–4 may hold one parison or any number of parisons, as for example, four, six or eight in order to obtain a higher production rate.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method for forming oriented, blown objects of moldable plastic material requiring prolonged tempering cycles to obtain conditions suitable for orientation which comprises: forming a parison by pressure molding in a closed mold cavity on a first core; providing a plurality of tempering molds in spaced relationship to each other and to said pressure mold for retaining and tempering said parison in a prolonged tempering cycle prior to orientation and blowing: relatively moving a first of said tempering molds and said first core into alignment with each other; transferring said parison from said first core to said first tempering mold; relatively moving said first core and first tempering mold to bring said parison into alignment with means for removing the parison from said first tempering mold and transferring said parison to at least one additional tempering mold spaced from said first tempering mold prior to orientation and blowing for prolonged tempering; providing a blow mold in spaced relationship with at least one of said tempering molds for forming said tempered parison into oriented, blown objects; removing said tempered parison from said at least one additional tempering mold by separate means at the end of the tempering cycle prior to orientation and blowing and placing same into said blow mold; and forming oriented, blown objects in said blow mold by means associated with said blow mold, whereby said tempering molds receive and release parisons seriatim and whereby the overall processing cycle is substantially unaffected by the number of tempering molds.

2. A method according to claim 1 wherein said separate means is a second core and wherein oriented, blown objects are formed in said blow mold on said second core.

3. A method according to claim 1 wherein said blow mold is in lateral linear alignment with at least one of said tempering molds and wherein at least during a portion of the residence of parisons in one of said tempering molds the parisons are out of said alignment with said blow mold and said at least one tempering mold.

4. A method according to claim 1 wherein the parisons are moved from tempering mold to tempering mold by means of separate cores engageable with said parisons.

5. A method according to claim 1 including a plurality of additional tempering molds adjacent each other wherein the parisons are moved from the first tempering mold to said additional tempering molds seriatim.

6. A method according to claim 5 wherein the parisons are moved in a rotary path.

7. A method according to claim 5 wherein the parisons are prepared in an injection mold spaced from said first tempering mold and in alignment with said blow mold and at least two of said tempering molds, and wherein a plurality of additional tempering molds are situated to the side of said alignment.

8. A method according to claim 7 wherein the parisons are shifted from tempering mold to tempering mold by means of cores engageable with said parisons.

9. A method according to claim 7 wherein said parisons are side shifted away from lateral alignment of the blow mold and at least two tempering molds, and then are side shifted towards said alignment.

10. A method according to claim 9 wherein said side shifting is with the aid of cores.

11. A method according to claim 1 for forming objects of polypropylene.

12. A method according to claim 1 wherein said parisons are side shifted to a neighboring position from said first tempering mold to a second tempering mold, wherein a plurality of said neighboring positions are provided corresponding to the actual tempering cycle desired, and wherein at least some of said neighboring positions are substantially perpendicular to said first tempering mold.

13. A method according to claim 1 wherein the parisons are maintained under controlled temperature conditions in said tempering molds.

14. A method according to claim 1 wherein the first tempering mold is laterally reciprocable into and out of axial alignment with said first core and wherein the first core is axially reciprocable.

15. A method according to claim 14 wherein said parison is transferred from said first core to a first one of said tempering molds by moving said first tempering mold into axial alignment with said first core and pressure mold, and removing said parison from said first core while in said first tempering mold.

16. A method according to claim 1 wherein said at least one additional tempering mold is stationary.

17. A method according to claim 1 wherein the blow mold is in lateral linear alignment with at least two of said tempering molds.

18. A method according to claim 17 wherein the first tempering mold reciprocates into and out of axial alignment with said first core and pressure mold without going out of linear alignment with said blow mold.

* * * * *